United States Patent [19]

Foster et al.

[11] Patent Number: 4,879,378

[45] Date of Patent: Nov. 7, 1989

[54] POLYSILOXANES WITH PENDANT STERICALLY HINDERED PHENOL MOIETY CONNECTED TO THE SILICON ATOM VIA A CARBONYLYOXY-CONTAINING LINK

[75] Inventors: George N. Foster, Bloomsbury, N.J.; Herbert E. Petty, Bethel, Conn.; Charles H. Blevins, II, Beacon, N.Y.

[73] Assignee: Union Carbide Chemicals and Plastics Company Inc., Danbury, Conn.

[21] Appl. No.: 330,811

[22] Filed: Mar. 30, 1989

[51] Int. Cl.[4] ................................................. C07F 7/08
[52] U.S. Cl. ..................................... 556/439; 556/440
[58] Field of Search ............................... 556/439, 440

[56] References Cited

U.S. PATENT DOCUMENTS

| | | | |
|---|---|---|---|
| 2,732,391 | 1/1956 | Noll | 556/440 |
| 2,770,631 | 11/1956 | Nierker | 556/440 |
| 3,112,333 | 11/1963 | Bailey | 556/439 |
| 3,328,350 | 6/1967 | Omietanski et al. | 260/46.5 |
| 3,328,450 | 6/1967 | Plueddemann | 260/448.8 |
| 3,539,655 | 11/1970 | Strachan et al. | 556/489 X |
| 3,579,467 | 5/1971 | Brown | 252/46.3 |
| 4,139,546 | 2/1979 | Berger et al. | 556/439 X |
| 4,374,742 | 2/1983 | Evans et al. | 556/440 X |
| 4,430,235 | 2/1984 | Chu et al. | 252/49.6 |
| 4,545,980 | 10/1985 | Hill | 556/440 X |
| 4,554,369 | 11/1985 | Hill et al. | 556/440 X |
| 4,562,278 | 12/1985 | Hill | 556/440 X |

OTHER PUBLICATIONS

CA Selects Organosilicon Chemistry: Issue 8, 1986, p. 14, #131201e; Issue 9, 1986, p. 21 #150606g; Issue 10, 1986, p. 10, #1691164; Issue 14, 1986, p. 11, #7394b; Issue 17, 1986, p. 12, #614887y.

Primary Examiner—Paul F. Shaver
Attorney, Agent, or Firm—Paul W. Leuzzi

[57] ABSTRACT

The present invention relates to polysiloxanes containing pendant sterically hindered phenol moieties. The compounds are represented by the general formula $MD_xD'_yM$.

11 Claims, No Drawings

POLYSILOXANES WITH PENDANT STERICALLY HINDERED PHENOL MOIETY CONNECTED TO THE SILICON ATOM VIA A CARBONYLYOXY-CONTAINING LINK

FIELD OF THE INVENTION

The present invention is directed to certain polysiloxanes having pendant sterically hindered phenol moieties attached to the siloxane chain. These compounds can be represented by the general formula $MD_xD'_yM$ and can be used to stabilize synthetic polymer compositions.

BACKGROUND

One of the frequent problems encountered with synthetic polymers is instability on exposure to light, heat and atmospheric conditions, leading to deterioration and color change. Over the years industry has developed many additives that are blended into the polymer to alleviate the problem and is still continuously searching for new materials that will prolong the life of the polymeric product. In addition to the above harmful conditions, many polymers contain metal catalyst residues that can exert adverse effects on the synthetic polymer fiber, film or other article.

The user of additives, collectively called stabilizers, to prevent or inhibit degradation of natural and synthetic materials is known. It is also known that a compound that stabilizes against heat and/or oxygen degradation in a material may not stabilize against light degradation in the same material, and vice versa. It is further known that a compound which exerts some form of stabilization in one type of synthetic or natural material may be completely ineffective in another type of material. Thus, compounds are classified as antioxidants, light stabilizers, heat stabilizers, etc., depending upon the stabilizing effect a particular compound may have on a specific material or type of material. As a consequence, in many cases mixtures of stabilizers are used to obtain desired protection against one or more forms of degradation.

It has now been found that a novel class of polysiloxanes having pendant sterically hindered phenol moieties can be produced that stabilize synthetic polymers against the deleterious effect caused by exposure to atmospheric conditions.

Polysiloxanes containing t-butyl substituted phenyl groups have been known for many years. Thus, U.S. Pat. No. 3,328,350, issued June 27, 1967 to G. M. Omietanski et al., discloses polysiloxanes of superior stability towards oxidative degradation which are the reaction products of selected substituted phenols with acyloxy terminated polysiloxanes. The final product contains the phenyl group in the polymer chain and it is not a pendant group.

In U.S. Pat. No. 3,328,450, issued June 27, 1967 to E. P. Plueddemann, there are disclosed alkyl phenol-substituted organosilicon compounds and polysiloxanes containing such compounds. However, none of the compounds disclosed contain a pendant sterically hindered phenol moiety connected to the silicon atom via a carbonyloxy-containing link.

The disclosure in U.S. Pat. No. 3,579,467, issued May 18, 1971 to E. D. Brown, also disclosed polysiloxanes containing a phenol moiety. However, the phenol moiety is not connected to the silicon atom via a carbonyloxy-containing link.

In U.S. Pat. No. 4,430,235, issued Feb. 7, 1984 to N. S. Chu et al., polymeric siloxane antioxidants are disclosed that contain an antioxidant moiety, for example, a hindered phenolic group. However, the reference does not suggest or disclose any compound in which the phenolic moiety is connected to the silicon atom via a carbonyloxy-containing link.

U.S. Pat. No. 4,535,113, issued Aug. 13, 1985 to G. N. Foster, et al., discloses olefin polymer compositions containing silicone additives. The siloxane additives, however, are not those of the instant invention.

The invention described in U.S. Pat. No. 4,645,844, issued Feb. 24, 1987 to A. Berger et al., discloses phenoxy-containing silane compounds wherein the phenoxy group is attached to the silicon atom via a methylene or alkylene link and nowhere suggests or discloses a connection via a carbonyloxy-containing link.

A number of abstracts in CA Selects Organosilicon Chemistry disclose a variety of phenol-substituted silanes useful as antioxidants, however, none of them disclose or suggest the compounds of this invention. (See: the silane of Issue 8, 1986, page 14, abstract 131201e; the disilane of Issue 9, 1986, page 21, abstract 15060g; the disiloxane of Issue 10, 1986, page 10, abstract 169116u; the silane of Issue 14, 1986, page 11, abstract 739b; and the silane of Issue 17, 1986, page 12, abstract 61488y.)

SUMMARY OF THE INVENTION

The present invention is directed to novel polysiloxanes of Formula (I) below, which contain a pendant sterically hindered phenolic moiety, as hereinafter defined:

$$MD_xD'_yM \tag{I}$$

DESCRIPTION OF THE INVENTION

Though some sterically hindered phenolic compounds have been disclosed in the prior art, to the best of our present knowledge the prior art has not disclosed compounds defined by Formula (I), nor have such compounds been suggested.

The polysiloxanes of this invention, Formula I, containing the pendant sterically hindered heterocyclic moiety have recurring groups of both the D unit and the D' unit in the polysiloxane chain, these units being represented by the formulas shown below, in which the pendant sterically hindered phenol moiety is attached to the silicon atom of the D' unit via a carbonyloxy-containing link.

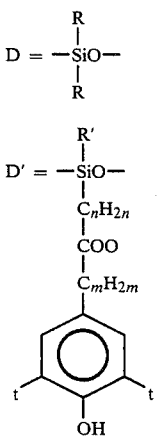

-continued $$M = R''R_2SiO_{\frac{1}{2}}-$$

wherein R is phenyl or an alkyl group having from 1 to about 3 carbon atoms, preferably methyl; R" is phenyl, or an alkyl group having from 1 to about 30 carbon atoms, preferably from 1 to about 20 carbon atoms and most preferably 1 to about 3 carbon atoms or an alkoxy group having from 1 to about 30 carbon atoms, preferably from about 12 to about 20 carbon atoms; r' is an alkyl group having from 1 to about 8 carbon atoms, preferably from 1 to 4 carbon atoms, phenyl or phenethyl; n has a value of from 0 to about 10, preferably 1 to 3; m has a value of about 2 to about 10 preferably 2 or 3; t is t-butyl; x has a value of about 0 to about 250 or more, preferably from about 4 to about 100 and more preferably less than 50; y has a value of from 2 to about 250 or more, preferably from about 4 to about 25. The

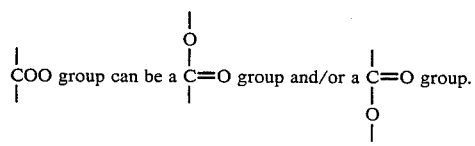

As is known the substituents on a single silicon atom need not all be the same. Thus, they can all be methyl groups or they can be a combination of two or more alkyl groups or other of the groups heretofore defined.

The polysiloxane chain can also contain any of the other siloxane units known to those skilled in the art.

Included among the polysiloxanes of this invention are the branched or star-type polymers that contain either the T unit or the Q unit, or both, in the polysiloxane chain, these units being represented by the formulas:

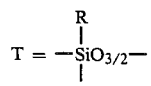

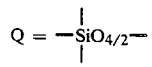

The preferred polysiloxanes of Formula (I) are those in which all of the R groups, the R' group and the R" group in the moieties are methyl groups.

Illustrative typical polysiloxane polymers of this invention are listed in Table I. In this table the numerals below the siloxane units identified in the heading indicate the average number of each such unit in the polymer chain, keeping in mine, as is known in the art, that all of a specifically identified unit need not necessarily be confined to a single segment in the polymer molecule.

TABLE I

| M | D | D' | M |
|---|---|----|---|
| 1 | 0 | 1 | 1 |
| 0 | 0 | 4 | 0 |
| 1 | 15 | 5 | 1 |
| 1 | 10 | 5 | 1 |

TABLE I-continued

| M | D | D' | M |
|---|---|----|---|
| 1 | 5 | 5 | 1 |
| 0 | 0 | 4 | 0 |
| 0 | 4 | 4 | 0 |
| 1 | 5 | 9 | 1 |
| 1 | 0 | 10 | 1 |
| 1 | 10 | 10 | 1 |
| 1 | 5 | 10 | 1 |
| 1 | 5 | 15 | 1 |
| 1 | 15 | 15 | 2 |
| 1 | 20 | 20 | 3 |

Illustratively, the polysiloxanes are conveniently produced by the direct catalytic hydrosilanation of a compound having a terminal vinyl group, e.g., 4(2-propenyl)-2,6-di-t-butylphenol or allyl-3-(3,5-di-(t-butyl)-4-hydroxyphenyl) propanoate, with a free hydroxyl group present on one of the siloxy units of a polysiloxane. Another method involves the catalytic hydrosilanation of the polysiloxane with allyl alcohol followed by transesterification with the methyl or ethyl ester of 3,5-di-(t-butyl)-4-carboxypropylphenol. Still another method involves the transesterification of an ester modified siloxy group with a hindered phenol via an available hydroxyl group, e.g., 2,6-di-(t-butyl)-4-hydroxyethylphenol. These general procedures are among those known to those of average skill in the art. In addition, any of the other known procedures can be used.

In the reaction an inert solvent is used, such as toluene, xylene, mesitylene, or higher alkane, which is subsequently removed by distillation or desolvation techniques. The reaction is generally carried out at reflux temperature in the presence of a catalyst.

The polysiloxanes represented by Formula (I) containing the sterically hindered phenol moiety can be used as additives in olefin polymers either as antioxidants and/or heat stabilizers and/or light stabilizers.

The following examples serve to further illustrate this invention. Parts are by weight unless otherwise specified. In the examples a nitrogen purge was used during the reaction.

EXAMPLE 1

A one liter 3-neck flask was equipped with thermometer, mechanical stirrer and distillation head/receiver assembly and was charged with 70 g of toluene, 100 g of MD$_{10}$D*$_{10}$M of the nominal formula:

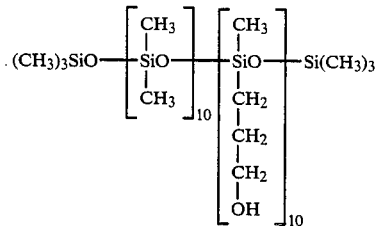

and 140 g of methyl 2-[3,5-di-(t-butyl)-4-hydroxyphenyl]propanoate. The mixture was stirred and heated under nitrogen and at about 45° C. a clear solution resulted at which point 1.5 g of tetraisopropyl titanate catalyst was added. The reaction was stirred at reflux (120° C. flask temperature) for about 4 hours. Distillate, 42,3 g, was recovered (90°–97° C. heat temperature) which analysis showed to be 35% methanol and 65% toluene, by weight. Continued distillation removed another 41.2 g to toluene. The flask contents were diluted with toluene, washed with water, dried over anhydrous sodium sulfate and concentrated to yield 210 g of viscous fluid of the average structure

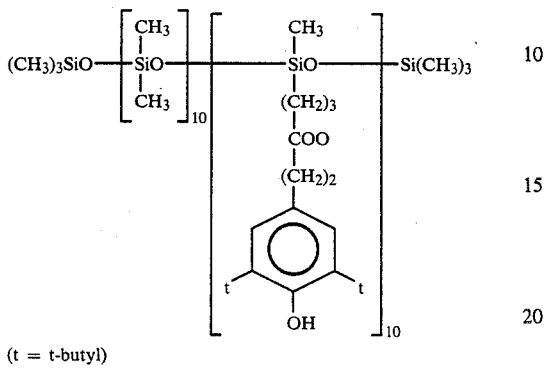

(t = t-butyl)

whose structure was confirmed by NMR analysis.

EXAMPLE 2

Using a reactor assembly and procedure similar to that described in Example 1, 740 grams of polysiloxane $MD_{15}D^*_5M$ was reacted with 623.4 g of methyl 2-[3,5-di-(t-butyl)-4-hydroxyphenyl]propanoate and 6.8 g of the catalyst using 410 g of toluene. There was recovered 1,225 g of viscous fluid of the average structure

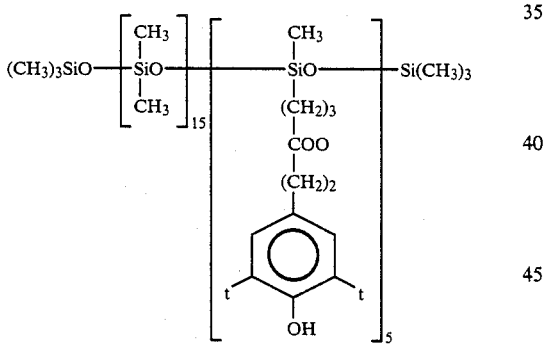

EXAMPLE 3

Using a reactor assembly similar to that described in Example 1, a polysiloxane of the nominal structure

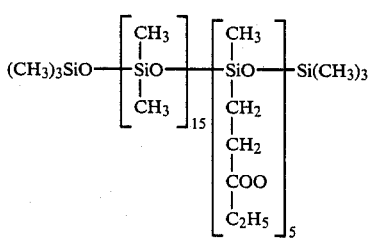

is transesterified with 2,6-di-(t-butyl)-4-hydroxyethylphenol to yield a polysiloxane of the nominal structure

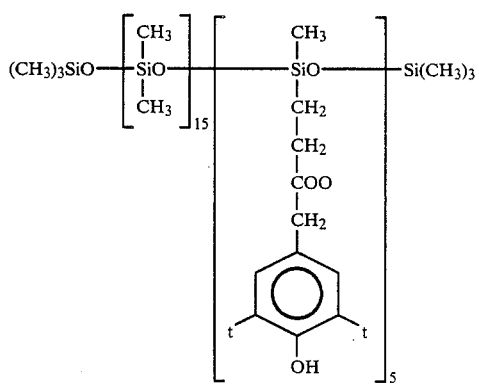

What we claim is:

1. A polysiloxane of the formula:

$$MD_xD'_yM \qquad (I)$$

wherein
$M = R''R_2SiO_{\frac{1}{2}}-$

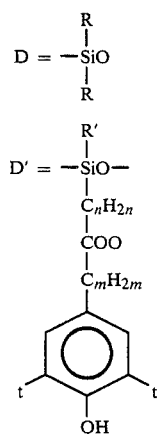

R = phenyl or a lower alkyl group;
R' = phenyl, phenethyl or an alkyl group having 1 to about 8 carbon atoms;
R'' = phenyl or an alkyl group or an alkoxy group having from 1 to about 30 carbon atoms;
t = tert-butyl;
n has a value of from 0 to about 10;
m has a value of about 2 to about 10;
x has a value of from 0 to about 250; and
y has a value of from 4 to about 250.

2. A polysiloxane as claimed in claim 1 wherein R'' is an alkyl group having from 1 to about 20 carbon atoms.

3. A polysiloxane as claimed in claim 1 wherein R'' is an alkyl group having from 1 to about 3 carbon atoms.

4. A polysiloxane as claimed in claim 1 wherein all of the R, R' and R'' groups are methyl groups.

5. A polysiloxane as claimed in claim 1 wherein all of the R and R' groups are methyl.

6. A polysiloxane as claimed in claim 1 wherein n has a value of 1 to 3.

7. A polysiloxane as claimed in claim 1 wherein m has a value of 2 or 3.

8. A polysiloxane as claimed in claim 1 wherein x plus y has a value of less than 50.

9. A polysiloxane as claimed in claim 1 of the nominal structure
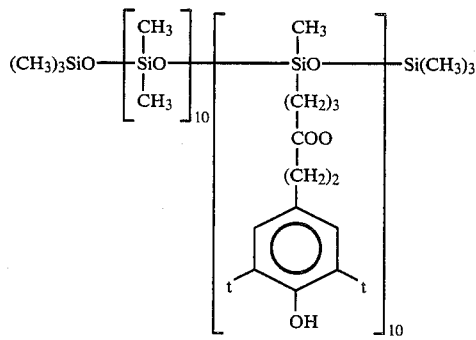
(t = t-butyl)
10. A polysiloxane as claimed in claim 1 of the nominal structure
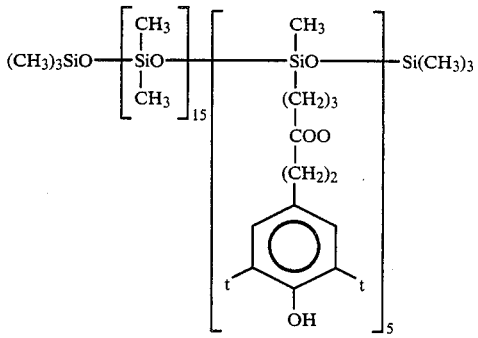
11. A polysiloxane as claimed in claim 1 of the nominal structure
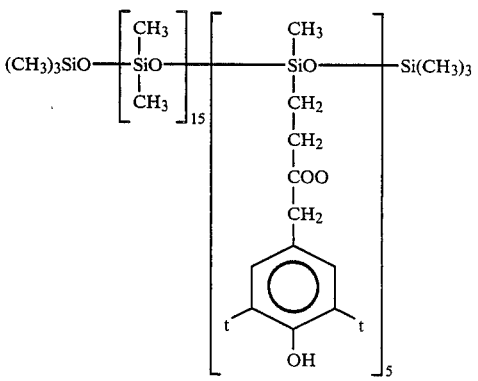
* * * * *